US009341506B2

(12) United States Patent
Spahlinger et al.

(10) Patent No.: US 9,341,506 B2
(45) Date of Patent: May 17, 2016

(54) METHOD FOR CONTROLLING EXCITATION ENERGY IN A COIL ARRANGEMENT OF A FLOW MEASURING DEVICE EMBODIED AS A TWO-CONDUCTOR FIELD DEVICE

(71) Applicant: Endress + Hauser Flowtec AG, Reinach (CH)

(72) Inventors: Andre Spahlinger, Bad Bellingen (DE); Thomas Kung, Basel (CH); Markus Rufenacht, Dornach (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 14/405,453

(22) PCT Filed: May 21, 2013

(86) PCT No.: PCT/EP2013/060424
§ 371 (c)(1),
(2) Date: Dec. 4, 2014

(87) PCT Pub. No.: WO2013/186019
PCT Pub. Date: Dec. 19, 2013

(65) Prior Publication Data
US 2015/0185056 A1 Jul. 2, 2015

(30) Foreign Application Priority Data
Jun. 12, 2012 (DE) .......................... 10 2012 105 042

(51) Int. Cl.
*G01F 1/58* (2006.01)
*G01F 1/56* (2006.01)
(Continued)

(52) U.S. Cl.
CPC .. *G01F 1/56* (2013.01); *G01F 1/60* (2013.01); *G01F 1/84* (2013.01)

(58) Field of Classification Search
CPC ................ G01F 1/66; G01F 1/60; G01F 1/58
USPC ................ 73/861.28, 861.17, 861.12, 861.11
See application file for complete search history.

(56) References Cited

U.S. PATENT DOCUMENTS 4,651,286 A 3/1987 Fukai
4,663,976 A 5/1987 Suzuki
(Continued)

FOREIGN PATENT DOCUMENTS

DE 3512921 A1 10/1986
DE 102008012341 B3 9/2009
(Continued)

OTHER PUBLICATIONS

English Translation of the International Preliminary Report on Patentability, WIPO, Geneva, Dec. 24, 2014.
(Continued)

*Primary Examiner* — Jewel V Thompson
(74) *Attorney, Agent, or Firm* — Bacon & Thomas, PLLCE

(57) ABSTRACT

A method for controlling excitation energy in a coil arrangement of a flow measuring device having an energy buffer system for storing energy and embodied as a two-conductor field device is provided for producing a magnetic field B passing through a medium as a function of the excitation energy. The wherein the flow measuring device has a plurality of operating states, between which it transfers and which describe an excitation current pulsed in a time interval. At least a first operating state is operated with a first power, in which the coil arrangement in a first period is excited with an excitation current with a first maximum electrical current level, wherein the period additionally has a first pulse pause, wherein the method is characterized by steps as follows: storing a fed-in excess power, which is beyond a minimum power for operating the device, for operating the coil arrangement during a period as a function of the supplied power in an energy buffer system; wherein an at least partial charging of the energy buffer system occurs in the first pulse pause and an at least partial discharging of the energy buffer system occurs during the excitation of the electrical current level; and changing into a second operating state, in which the coil arrangement is excited in a second period with an excitation current, wherein the second period has a second pulse pause, which is shorter than the first pulse pause.

10 Claims, 1 Drawing Sheet

(51) Int. Cl.
  *G01F 1/60* (2006.01)
  *G01F 1/84* (2006.01)

(56) References Cited

U.S. PATENT DOCUMENTS

| | | | |
|---|---|---|---|
| 4,766,770 A | 8/1988 | Mannherz | |
| 5,018,391 A * | 5/1991 | Doll | G01P 5/083 73/861.12 |
| 5,351,554 A * | 10/1994 | Budmiger | G01F 1/60 73/861.16 |
| 5,641,914 A * | 6/1997 | Doll | G01F 1/60 73/861.12 |
| 6,269,701 B1 * | 8/2001 | Keech | G01F 1/60 73/861.08 |
| 6,729,191 B1 | 5/2004 | Fonteneau | |
| 2002/0000798 A1 | 1/2002 | Schweitzer | |

FOREIGN PATENT DOCUMENTS

| WO | 2009109561 A1 | 9/2009 |
|---|---|---|
| WO | 2009154115 A1 | 12/2009 |

OTHER PUBLICATIONS

German Search Report, German PTO, Munich, Feb. 25, 2013.
International Search Report, EPO, The Netherlands, Aug. 6, 2013.

* cited by examiner

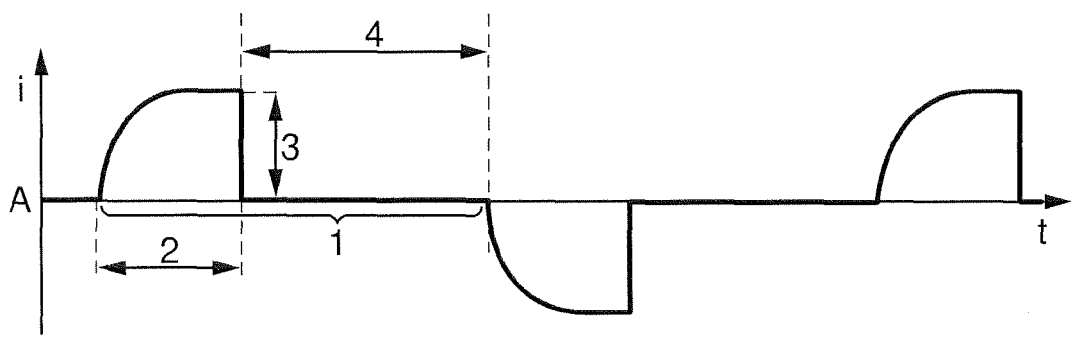
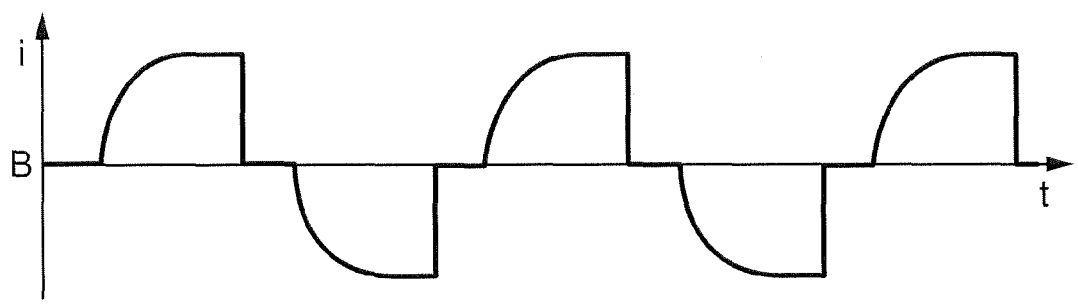
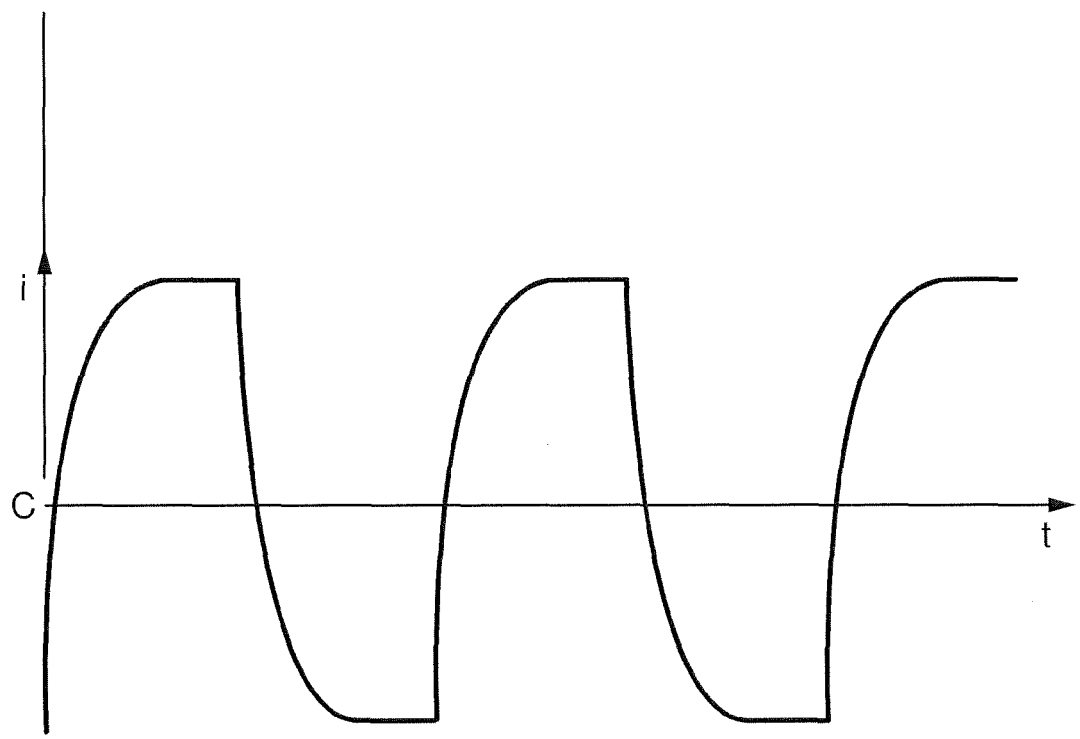

METHOD FOR CONTROLLING EXCITATION ENERGY IN A COIL ARRANGEMENT OF A FLOW MEASURING DEVICE EMBODIED AS A TWO-CONDUCTOR FIELD DEVICE

TECHNICAL FIELD

The invention relates to a method for controlling excitation energy in a coil arrangement of a flow measuring device.

BACKGROUND DISCUSSION

Magneto inductive flow measuring devices utilize for volumetric flow measurement the principle of electrodynamic induction: Charge carriers of the medium moved perpendicularly to a magnetic field induce a voltage in electrodes likewise arranged essentially perpendicular to the flow direction of the medium and perpendicular to the direction of the magnetic field. The induced measurement voltage is proportional to the flow velocity of the medium averaged over the cross section of the measuring tube and, thus, proportional to the volume flow rate. If the density of the medium is known, the mass flow in the pipeline, respectively the measuring tube, can be determined. The measurement voltage is usually tapped via the electrode pair arranged in the region of the measuring tube where the maximum magnetic field strength and, thus, the maximum measurement voltage is to be expected. The electrodes are usually coupled galvanically with the medium; however, also known are magneto inductive flow measuring devices with contactless, capacitively coupling electrodes.

The measuring tube can be manufactured either from an electrically conductive material, e.g. stainless steel, or from an electrically insulating material. If the measuring tube is manufactured from an electrically conductive material, then it must be lined in the region coming in contact with the medium with a liner of an electrically insulating material. The liner is composed, depending on temperature and medium, for example, of a thermoplastic, thermosetting or elastomeric, synthetic material. However, also known are magneto inductive flow measuring devices having a ceramic lining.

Historically, such two-conductor field devices are predominantly so designed that an instantaneous electrical current level of the supply current instantaneously flowing in the single pair line formed as an electrical current loop is set at a value lying between 4 mA and 20 mA and simultaneously also represents the measured value instantaneously produced by the field device, respectively the actuating value sent instantaneously to the field device. As a result of this, a special problem of such two-conductor field devices is that the electrical power at least nominally usable or to be used by the field device electronics—in the following referred to for short as "available power"—can during operation fluctuate in a practically unpredictable manner over a broad range. Taking this into consideration, modern two-conductor field devices (2L field devices), especially modern two-conductor measuring devices (2L measuring devices), with a (4 mA to 20 mA) electrical current loop are, consequently, usually so designed that their device functionality implemented by means of a microcomputer provided in the evaluating and operating circuit is changeable, and, thus, the operating and evaluating circuit, which most often in any event uses only little power, can be matched to the instantaneously available power.

Of all the components of a magneto inductive flow measuring device, the coil arrangement for producing the magnetic field B passing through the measured material has the greatest energy requirement.

SUMMARY OF THE INVENTION

An object of the invention, therefore, is to provide a method, which manages, as efficiently as possible, the power available to a two-conductor field device in the form of a flow measuring device.

The invention achieves this object a method for controlling excitation energy in a coil arrangement of a flow measuring device having an energy buffer system for storing energy and embodied as a two-conductor field device is provided for producing a magnetic field B passing through a medium as a function of the excitation energy, wherein the flow measuring device has a plurality of operating states, between which it transfers and which describe an excitation current pulsed in a time interval, wherein at least a first operating state is operated with a first power, in which the coil arrangement in a first period is excited with an excitation current with a first maximum electrical current level, wherein the period additionally has a first pulse pause, wherein the method is characterized by steps as follows:

A) storing a fed-in excess power, which is beyond a minimum power for operating the device, for operating the coil arrangement during a period as a function of the supplied power in an energy buffer system;
wherein an at least partial charging of the energy buffer system occurs in the first pulse pause and an at least partial discharging of the energy buffer system occurs during the excitation of the electrical current level; and
B) changing into a second operating state, in which the coil arrangement is excited in a second period with an excitation current, wherein the second period has a second pulse pause, which is shorter than the first pulse pause.

In such case, the coil arrangement is considered to be a consumer group, which is continuously operated with at least a minimum power. A coil arrangement includes, in such case, preferably coils and a circuit. By the method of the invention, excess energy can effectively be utilized for lessening the pause pulse ratio to strive toward continuous operation or increasing of the amplitude of the excited electrical current level.

Advantageously, a capacitor, i.e. a cost effective component, is used as the energy buffer system.

It is additionally advantageous, when control of the excitation energy occurs independently of the terminal voltage and/or terminal current lying on the flow measuring device. Depending on construction, the terminal voltage and/or the terminal current are only time discretely tappable.

An especially preferred operating state is when a continuously pulsed excitation current is produced with a second pulse pause of zero.

The method can be applied both in magneto inductive flow measuring devices and in Coriolis flow measuring devices.

BRIEF DESCRIPTION OF THE DRAWINGS

The method of the invention will now be discussed in greater detail based on a magneto inductive flow measuring device with reference to the appended drawing, the sole FIGURE of which, FIG. 1, shows waveforms for three operating states.

DETAILED DISCUSSION IN CONJUNCTION WITH THE DRAWINGS

A flow measuring device works, to the extent that no information as regards the terminal current and the terminal voltage, i.e. the electrical current level and voltage applied to the power supply, are known, with minimal power until other information becomes available. On the other hand, the voltage is independent of the flow—it depends only on external factors. The therefrom resulting power is a combination of the flow proportional, electrical current level and the externally influenced voltage.

FIG. 1 shows three operating states A, B and C. Traditionally in the case of a magneto inductive flow measuring device embodied as a two-conductor field device, only the first operating state A is used. This can be justified by considering that the minimal power, with which the two-conductor flow measuring device is continuously operated, is exactly sufficient to effect this operating state A. It is known that other devices likewise change operating states. However, such is not based on the charge state of the energy storer, respectively the energy buffer system.

By providing an energy storage system, there occurs according to the invention upon rising power an intermediate storage in the energy buffer system, which supplies the coil arrangement with a pulsed excitation current. In such case, a first period 1 includes an induction time 2 up to reaching a maximum electrical current level 3 and a thereon following, pulse pause 4, in which no excitation occurs.

If one considers the operating state A, the energy buffer system discharges within the induction time. In the first pulse pause 4, the energy buffer system is charged. To the extent that the system is fed more power than needed for performing the first operating state, there is only a partial discharge of the energy buffer system, so that this is continuously charged by the excess power.

Preferably simultaneously with the energy storage or after the power storage, the flow measuring device can change in ongoing operation into the operating state B or—especially preferably—into the operating state C, which has continuously cycled production of excitation current. In operating state C, the pulse pause amounts to zero. However, the amplitude of the excitation current, respectively the maximum electrical current level, can still increase.

During presence of higher power, the energy buffer system can be charged faster. In this way, the time intervals, when no growth of the electrical current level is present, can be shortened. This is shown in FIG. 1 by the operating state B.

During presence of a yet higher power, the flow measuring device can transfer into the especially preferred operating state C, in the case of which a continuous electrical current supply is possible. In such case, the signal-noise separation is enlarged, so that more signal is perceived, this meaning, on the whole, that a more exact measured value determination is enabled.

The invention claimed is:

1. A method for controlling excitation energy in a coil arrangement of a flow measuring device having an energy buffer system for storing energy and embodied as a two-conductor field device for producing a magnetic field B passing through a medium as a function of the excitation energy, wherein the flow measuring device has a plurality of operating states, between which it transfers and which describe an excitation current pulsed in a time interval, wherein at least a first operating state is operated with a first power, in which the coil arrangement in a first period is excited with an excitation current with a first maximum electrical current level, wherein the period additionally has a first pulse pause, wherein the method comprising the steps of:

A) storing a fed-in excess power, which is beyond a minimum power for operating the device, for operating the coil arrangement during a period as a function of the supplied power in an energy buffer system; wherein an at least partial charging of the energy buffer system occurs in the first pulse pause and an at least partial discharging of the energy buffer system occurs during the excitation of the electrical current level; and B) changing into a second operating state, in which the coil arrangement is excited in a second period with an excitation current, wherein the second period has a second pulse pause, which is shorter than the first pulse pause.

2. The method as claimed in claim 1, wherein:
the flow measuring device changes between two operating states as a function of the charge status of the energy buffer system.

3. The method as claimed in claim 1, wherein:
a capacitor is used as energy buffer system.

4. The method as claimed in claim 1, wherein:
control of the excitation energy occurs independently of a terminal voltage and/or terminal current lying on the flow measuring device.

5. The method as claimed in claim 1, wherein:
the second operating state enables production of a continuously pulsed excitation current with a second pulse pause of zero.

6. The method as claimed in claim 1, wherein:
the energy buffer system is integrated into the housing of the flow measuring device, preferably a magneto inductive or a Coriolis flow measuring device.

7. The method as claimed in claim 1, wherein:
the energy buffer system has a minimum storage capacity of 20 mJ, preferably for an electrical current level of 0-30 mA.

8. The method as claimed in claim 1, wherein:
in the second operating state the coil arrangement is excited in a second period with an excitation current with the first maximum electrical current level.

9. The method as claimed in claim 1, wherein:
in the second operating state the coil arrangement is excited in a second period with an excitation current with a second maximum electrical current level; and
the second maximum electrical current level is greater than the first maximum electrical current level.

10. The method as claimed in claim 1, wherein:
the second pulse pause is zero.

* * * * *